(12) United States Patent
Lamminmäki et al.

(10) Patent No.: US 9,212,066 B2
(45) Date of Patent: Dec. 15, 2015

(54) PROCESS OF PREPARING TITANATES

(75) Inventors: Ralf-Johan Lamminmäki, Ulvila (FI); Jani Kallioinen, Pori (FI); Arja-Leena Ruohonen, Pori (FI)

(73) Assignee: SACHTLEBEN PIGMENTS OY (FI)

( * ) Notice: Subject to any disclaimer, the term of this patent is extended or adjusted under 35 U.S.C. 154(b) by 1128 days.

(21) Appl. No.: 13/127,322

(22) PCT Filed: Nov. 4, 2008

(86) PCT No.: PCT/FI2008/050629
§ 371 (c)(1),
(2), (4) Date: Jul. 13, 2011

(87) PCT Pub. No.: WO2010/052363
PCT Pub. Date: May 14, 2010

(65) Prior Publication Data
US 2011/0274614 A1 Nov. 10, 2011

(51) Int. Cl.
*C01G 23/04* (2006.01)
*C01G 45/00* (2006.01)
*C01G 23/00* (2006.01)
*C01G 23/053* (2006.01)
*C01G 25/00* (2006.01)
*C01G 27/00* (2006.01)
*C01G 49/00* (2006.01)
(Continued)

(52) U.S. Cl.
CPC ............... *C01G 45/006* (2013.01); *B82Y 30/00* (2013.01); *C01G 23/005* (2013.01); *C01G 23/006* (2013.01); *C01G 23/0532* (2013.01); *C01G 25/00* (2013.01); *C01G 27/006* (2013.01); *C01G 49/009* (2013.01); *C01G 53/00* (2013.01); *C01P 2002/72* (2013.01); *C01P 2002/74* (2013.01); *C01P 2004/52* (2013.01); *C01P 2004/62* (2013.01); *C01P 2004/64* (2013.01); *C01P 2006/10* (2013.01); *C01P 2006/12* (2013.01); *C01P 2006/80* (2013.01); *C01P 2006/82* (2013.01)

(58) Field of Classification Search
None
See application file for complete search history.

(56) References Cited

U.S. PATENT DOCUMENTS 4,859,448 A 8/1989 Klee et al.
5,445,806 A 8/1995 Kinugasa et al.
(Continued)

FOREIGN PATENT DOCUMENTS

EP 0141551 10/1984
EP 0444798 A2 2/1991
(Continued)

OTHER PUBLICATIONS

Synthesis of BaTi2O5 nanobelts. Li Wang et al. (Materials Research Bulletin, 2006 842-846.*
(Continued)

*Primary Examiner* — Melvin C Mayes
*Assistant Examiner* — Colette Nguyen
(74) *Attorney, Agent, or Firm* — Gearhart Law LLC

(57) ABSTRACT

Processes of preparing metal titanate from one or more metal compounds, and a product provided by the process. In one embodiment, sodium titanate and an ionic metal compound are mixed into an aqueous mixed slurry, which is allowed to react into metal titanate at the boiling point of the mixed slurry or below, by mixing it at normal pressure and in a normal gaseous atmosphere. After this, the metal titanate product is optionally washed, and/or filtered and dried.

16 Claims, 4 Drawing Sheets

(51) Int. Cl.
*C01G 53/00* (2006.01)
*B82Y 30/00* (2011.01)

(56) References Cited

U.S. PATENT DOCUMENTS

| | | | |
|---|---|---|---|
| 6,352,681 | B1 | 3/2002 | Horikawa et al. |
| 2004/0028601 | A1 | 2/2004 | Torii et al. |
| 2008/0124260 | A1* | 5/2008 | Roche et al. ............... 423/83 |

FOREIGN PATENT DOCUMENTS

| EP | 0 444 798 | A2 | 9/1991 |
|---|---|---|---|
| EP | 1205440 | B1 | 11/2001 |
| JP | EP1205440 | * | 11/2001 |
| WO | 2007015622 | A1 | 2/2007 |
| WO | 2010052363 | A1 | 5/2010 |

OTHER PUBLICATIONS

CA Search Report—CA Patent Application 2742415; Issued Mar. 22, 2013; 4 pages.

International Preliminary Report on Patentability for International Application No. PCT/FI2008/050629; Filing Date: Nov. 4, 2008; 6 pages.

Reply to Written Opinion regarding International Application PCT/FI2008/050629; filed Sep. 6, 2010; 5 pages.

Wang, Li, et al. "Synthesis of BaTi2O5 nanobelts", Science Direct; Elsevier; available online at www.sciencedirect.com; Materials Research Bulletin 41 (2006); available online Oct. 21, 2005; pp. 842-846.

* cited by examiner

PROCESS OF PREPARING TITANATES

CROSS REFERENCE TO RELATED APPLICATIONS

This is a U.S. national stage of Application No. PCT/F12008/050629; filed on Nov. 4, 2008; the disclosure of which is also incorporated herein by reference.

BACKGROUND OF THE INVENTION

The invention relates to a process of preparing small crystal size metal titanates. In particular, the invention relates to the preparation of small crystal size alkali earth titanates.

Metal titanates are used in various electronic applications due to their electrical, electro-optical and electro-mechanical properties, among others. Known compounds of this kind include, e.g. barium titanates and barium strontium titanates, i.e., BSTO materials. They are used in multilayer ceramic capacitors, dynamic access random memories (DRAM), positive temperature coefficient of resistance thermistors, sensor applications, piezoelectric equipment and as ceramic insulators, in general, or in corresponding applications. Their use as insulating materials is based on a high dielectric constant.

Numerous processes in preparing titanates are known but, typically, they employ processes that require high temperatures or pressures, to achieve the desired end product. Many of the published processes also deal with the recovery of titanates under very dilute solution conditions, which is generally not desirable on an industrial scale. When the concentrations are high, a greater production capacity is achieved and less energy is required for possible evaporations and other factors that affect the economic efficiency of the processes. Furthermore, both the handling properties and the costs of the raw materials should be such that the materials would be applicable in the industrial environment of use. In so far as the preparation begins with crystalline titanium dioxide, $TiO_2$, then typically, there would be a problem of running other different size metal ions and/or those with a different charge into the original crystal lattice. A change in the crystal lattice does not take place under all conditions, at least not under usable conditions. It is generally known that in the preparation of titanates, a relatively high temperature, of as much as over 1000° C., must be used, or in solution reactions, a special pressure reactor must be used, where the temperature can be raised to a high level. Furthermore, many reactors employ special gaseous atmospheric conditions.

In literature, it is known that nanocrystalline barium titanate ($BaTiO_3$) is a usable material in various commercial applications, due to its electric and ferroelectric properties, in particular. In MLCs (multilayer capacitors), the use of barium titanate is based on its high dielectric constant, and in converters and sensors, on its piezoelectric properties. Other applications include electro-optical devices and various chemical switches.

The ferroelectric properties and the use of barium titanate in applications are based on the crystal structure of the compound. The crystal structure is cubic at high temperatures and barium titanate does not have ferro-electric properties at that time. Along with a decrease in temperature, the cubic structure distorts into tetragonal, orthorhombic and rhombohedral structures that are ferro-electric. Additionally, $BaTiO_3$ can also have a hexagonal structure.

The problems encountered with the preparation of barium titanate have included variations in the crystal structure, a non-stoichiometric composition, a poor repeatability of the electric properties and the preparation of sufficiently small crystals, e.g. below 200 nm. This has resulted in a development of new processes of preparation that take place in a solution. The preparation processes of the industrial scale favour low reaction temperatures and short reaction times. Such preparation processes include the sol-gel process, homogeneous precipitation, hydrolysis and hydrothermal process, as well as a process based on the condensation of vapours. Furthermore, barium titanate can be prepared by means of an ultra sound pyrolysis or by degrading organometallic compounds. Of these processes, the most suitable ones for the industrial scale include the traditional annealing preparation or the hydrothermal process.

In a solid-state reaction, barium carbonate and titanium dioxide are heated at high temperatures, such as 800-1430° C. Another disadvantage is the strong sintering of crystals and the remaining impurities.

In the hydrothermal process, barium titanate is hydrothermally formed in alkaline (pH>12) aqueous solutions at a raised temperature and pressure. The required temperatures are 100-300° C., when the pressure is within 0.5-5 MPa. As starting materials, for example, barium hydroxide and barium chloride can be used and, as sources of titanium, titanium alkoxides, titanium oxides or titanium oxide gels can be used. The dynamic interactions between the $TiO_2$ molecules and $Ba^{2+}$ and $OH^-$ ions determine the generation of the nucleating centres of barium titanate and the mechanism of crystal growth. Typically, the hydrothermal reaction includes a solution drifting through slurry, its adsorption into the surface, and the dehydration, surface diffusion of the components of the solution and, finally, the formation and growth of the crystal. The tetragonal form can be prepared hydrothermally, when the preparation temperature is within 450-600° C., or when chloride ions are added to the reaction mixture. The tetragonal structure can also be formed by heating a product that has been prepared hydrothermally at about 1000° C.

One problem with the hydrothermal process is its unsuitability to an economic industrial preparation process, as the pressure reactor causes safety risks and incurs investment costs. Furthermore, the high pressure and temperature considerably slow down the efficiency of the batch process, due to the longer heating and cooling stages required by the same, thus essentially decreasing the energy effectiveness of the process.

In addition, using a water-based process may create side products, such as $BaCO_3$, and unwanted crystal forms, such as $Ba_2TiO_4$, which must be removed from the product. When using precipitation with NaOH or KOH, alkali metal ions may remain in the crystal structure; therefore, the preparation of a pure nanocrystalline $BaTiO_3$ crystal form has proven to be challenging.

In the Patent Specification EP141551, barium titanate, strontium titanate or a powder that consists of the solid solution thereof is prepared, its average particle size with a regular spherical shape being 0.07-0.5 µm, BET 20 m²/g or less, and the crystal size 0.05 µm or larger. In the process, titanium oxide hydrate is allowed to react with barium hydroxide and/or strontium hydroxide at a temperature of 60-110° C., so that 120-2000 mol of water per mol of titanium is present in the reaction. Titanium oxide hydrate is preferably selected from among orthotitanium acid, metatitanium acid and titanium oxide, of which orthotitanium acid is the most preferable due to its high reactivity. The reaction time is preferably 30 min or longer, in order for the reaction to proceed as far as possible. If the reaction temperature is below 60° C., it was observed that the reaction speed was too slow for a practical implementation. On the basis of examples, the reaction temperature is preferably about 100° C. The combined mole amount of barium hydroxide and/or strontium hydroxide used in the process, in relation to the amount of titanium oxide hydrate, is 1.3-5.0. The high-temperature requirement is a consequence of the titanium starting materials used in the process and the apparently weak reaction conditions, which make an effective reaction between the starting materials difficult. Furthermore, the dilute titanium content and the $CO_2$ limitations, as well as the use of a nitrogen treatment, render the process problematic on an industrial scale.

The Patent Specification US200410028601 describes a process of preparing powder that has the $ABO_3$ perovskite structure. In this process, A-hydroxide, such as $Ba(OH)_2 \cdot 8H_2O$, is dissolved in water to form a strong solution or melt, and B-oxide, such as anatase $TiO_2$, is added to this hydroxide, whereupon they are allowed to react with each other at a temperature of about 70° C., based on the examples. In that case, extremely small, microcrystalline particles are formed, such as cubic $BaTiO_3$ crystals, which contain discernible impurities. The BET of the particles is about 60-100 $m^2/g$ and the crystal size about 20 nm. The product is dried and calcined at a temperature of over 900° C., whereby tetragonal $BaTiO_3$ is obtained, its BET being below 10 $m^2/g$ and its particle size over 100 nm.

The Patent Specification WO2007015622 describes a hydrothermal synthesis for the preparation of barium titanate with a particle size of below 1000 nm. In the process, the aqueous titanium acid compound, obtained from a sulphate process, is reacted with crystalline titanium oxide and barium hydroxide at 60-300° C. and at a high pressure of 5-50 Kgf/$cm^2$ for 10 minutes −10 hours, using a barium hydroxide excess. The product is dried and calcined under reducing conditions at 600-1400° C. The Ba/Ti molar ratio of the product is 1.000±0.002. The reducing condition and the high pressure that are used in the process make it impractical, even dangerous, for industrial processes.

The Patent Specification U.S. Pat. No. 5,445,806 discloses a process of preparing a perovskite type of product, such as tetragonal barium titanate, its average particle size being below 300 nm. In the process, an alkali earth compound, such as Ba (and/or Sr) are reacted, for example, with a $Ti^{4+}$ compound at a temperature of about 100° C. and at an atom ratio of Ba(and/or Sr)/Ti of 1-1.4. The barium compound can be a hydroxide and titanium compound, e.g. a titanium oxide hydrate prepared from titanium tetrachloride, preferably an organometallic compound. The dried product thus obtained is preferably calcined at a temperature of 1000-1100° C. and purified by removing the extra Ba. The product obtained is $BaTiO_3$, wherein the Ba/Ti ratio is 1-1.4 and the average particle size is 50-300 nm. The chlorine residual, resulting from the chloride starting materials, may weaken the quality of the end product and the product must be calcined at a high temperature to provide the desired titanate product.

The Patent Specification U.S. Pat. No. 6,352,681 describes a process of preparing barium titanate, wherein the aqueous solution of a titanium compound, such as water-soluble titanium salt, preferably halide, and the aqueous solution of a barium compound, such as barium hydroxide, and alkali metal hydroxide are added to an alkaline solution and kept at 90° C. whilst being subject to stirring. The barium titanate thus generated is recovered and dried. In the reaction, the molar ratio of the titanium compound and the barium compound was kept within 0.8-1.2. The product thus obtained is micro-crystalline; its particle size is below 60 nm and its Ba/Ti atom ratio is close to one.

The Patent Specification U.S. Pat. No. 4,859,448 describes a process of preparing powdery barium titanate from titanium dioxide and barium hydroxide, $Ba(OH)_2 \cdot 8H_2O$. The titanium dioxide is amorphous titanium dioxide that is prepared from titanium alkoxide, such as titanium tetraethoxide, its water content being about 0.5 mol. The compounds are reacted in water at a temperature of 60-95° C., so that there is no carbon dioxide present in the reaction conditions. After the reaction, the non-reacted barium hydroxide is removed and the product is dried. The product obtained is tetragonal $BaTiO_3$, the particle size of which is 10-500 nm. The starting materials used in the process cannot be considered on the industrial scale and the process described is too sensitive to external disturbances, such as variations in the carbon dioxide content of the environment.

The purpose of the present invention is to disclose an industrially simple and effective process of preparing small crystal size metal titanates that have a high dielectric constant.

Another purpose of the present invention is to provide a low-temperature process of preparing metal titanates, Ba and Sr or BaSr titanates, in particular.

SUMMARY OF THE INVENTION

The first aspect of the invention discloses a process of preparing metal titanates. The second aspect of the invention is a metal titanate product provided by the said process.

The inventors of the present invention have surprisingly observed that, by using sodium titanate as starting material in the preparation of metal titanates, the sodium contained in the structure can relatively simply be replaced with another metal cation, which has an essentially larger size and higher charge than sodium has. The process according to the invention provides small crystal size metal titanate, such as barium or strontium titanate or barium strontium titanate, which has a high dielectric constant, in a simple and effective way, at a low temperature and on an industrial level.

Sodium titanate has proven to be an excellent starting material for the preparation of metal titanates, for industrial preparation, in particular. It has chemical properties and processability, which render it well-suited to a large scale; it is an advantageous, well-preservable starting material, which contains a small amount of impurities only and is obtained in large amounts, for example, from the preparation process of micro-crystalline titanium dioxide in a known manner. The use of sodium titanate as starting material definitely enables conditions, such as a low temperature, normal air pressure and normal gaseous atmosphere, which are gentler for the reaction of metal titanate than when using titanane dioxide as the source of titanium, for example. The advantageous reaction conditions enable a small crystal size and simple and economic processing of metal titanate.

Furthermore, the sodium titanate obtained from the titanium dioxide process can be used as such as slurry, and it does not need to be separately dried before use in the preparation of metal titanate.

When sodium titanate is used as starting material in the preparation of metal titanate, a high titanium content is obtained in the reaction phase. Depending on the process, which is used to prepare the sodium titanate, a chlorine-free starting material is obtained and, thus, a chlorine-free product, or a starting material that contains very little sulphates, whereby there is no risk of generating a poorly degradable or soluble barium sulphate, for example.

In the present invention, a cation exchange reaction is utilized. Using the treatment according to the process, the cation in the metal titanate starting material can be replaced with another cation. For example, the sodiums in the sodium titanate are replaced with bariums to provide a crystalline BaTiO$_3$ compound. The process essentially reduces the possibility of forming unwanted intermediate products and, thus, improves the electric properties of the product and enables a simple process and process conditions.

DETAILED DESCRIPTION OF THE INVENTION

In the process according to the first aspect of the invention, metal titanate is prepared from one or more metal compounds through the following stages:
(i) sodium titanate and an ionic metal compound or compounds, if there are several compounds simultaneously present, are mixed into a mixed aqueous slurry, and
(ii) the mixed slurry is allowed to react into metal titanate at the boiling temperature of the mixed slurry or below the same, by mixing it at normal pressure and in a normal gaseous atmosphere, after which
(iii) the metal titanate product is optionally washed, and/or filtered and dried.

The process preferably also includes a further processing step, wherein the dried metal titanate product is further processed by calcining. The calcination is preferably carried out at a temperature of 950° C. or below; the calcining temperature is more preferably 800° C. or below, most preferably at a temperature of 750° C. or below, such as 450-750° C. The calcination time is 2 h, at the most, preferably 90 min, at the most. By calcining the product, the crystal size and crystal structure of metal titanate can be affected by means of the temperature, e.g. when tetragonal barium titanate is to be provided.

The product provided by the process according to the invention is crystalline without a separate heat treatment. By drying, crystalline, e.g., cubic strontium, barium or barium strontium titanate is preferably provided.

The sodium titanate according to the invention can be a commercial, known sodium titanate, either in solid form or as a liquid-bearing slurry, preferably an aqueous slurry.

Using alkali precipitation or hydrolyzing, sodium titanate can be prepared from various known titanium compounds, such as titanium halides, alcohols or organotitanium compounds, which, however, are generally difficult-to-handle and expensive starting materials that possibly bring impurities to the process.

According to an embodiment, sodium titanate is any known stable sodium titanate with properties that render it suitable to be used under the conditions according to the invention. Sodium titanate is preferably in the form of the formula Na$_x$Ti$_y$O$_z$. x, y, and z are more preferably according to those shown in Table 1, as is well known.

Figure 1:
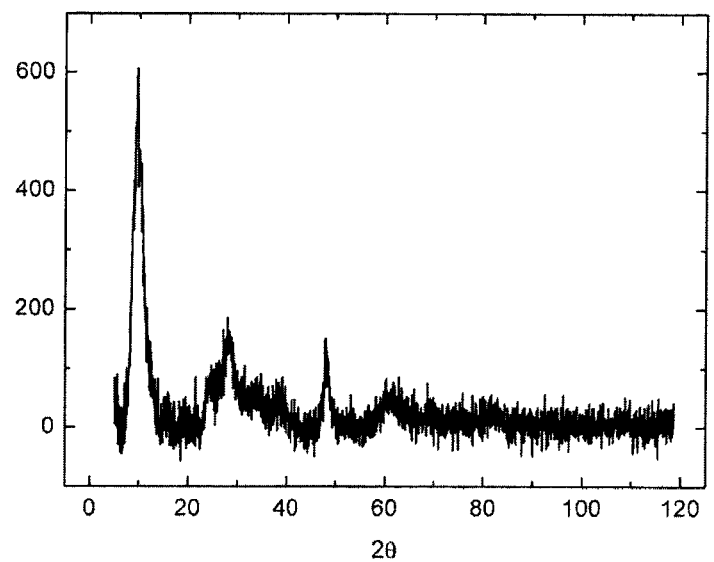
FIG. 1 shows an x-ray powder diffractogram of the sodium titanate that is suitable for the starting material of the process according to the invention.

Using x-ray powder diffraction measurements, it has been observed that the sodium titanate according to the invention most preferably has characteristic reflections at angles of about 10°, about 24°, about 28° and about 48° two-theta, as shown in FIG. 1. The x-ray powder diffractogram is determined using a Cu pipe (Cu Kα), 40 kV/40 mA, in the two-theta angle range of 10-135°, scale spacing 0.02° and the time per scale division 1.0 s.

According to a preferred embodiment, sodium titanate is of the form Na$_4$Ti$_9$O$_{20}$, Na$_4$Ti$_9$O$_{20}$·H$_2$O or Na$_{(4-x)}$H$_x$Ti$_9$O$_{20}$, wherein x represents a dissolved amount of Na and OH ions.

TABLE 1

|   | min | max | min | CAS Registration Number | max | CAS Registration Number |
|---|-----|-----|-----|------------------------|-----|------------------------|
| x | 0.1 | 20  | Na$_{0.23}$TiO$_2$ | 33-1295 22-1404 | Na$_{16}$Ti$_{10}$O$_{28}$ | 76-0686 |
| y | 0.2 | 20  | Na$_4$Ti$_{0.3}$O$_{2.6}$ | 28-1153 | Na$_2$Ti$_{12}$O$_{25}$ | 80-0467 |
| z | 2.0 | 30  | NaTiO$_2$ | 16-0251 | Na$_{16}$Ti$_{10}$O$_{28}$ | 76-0686 |

According to a preferred embodiment, sodium titanate is prepared from a titanium dioxide hydrate that is generated in the preparation of titanium dioxide, preferably by a sulphate process, by processing it with alkali into a sodium titanate slurry. The sodium titanate is more preferably prepared from an ilmenite concentrate by means of sulphuric acid, by hydrolyzing the titanium dioxide hydrate, which is elutriated in water to a density of 300-400 g/l, into a titanium dioxide hydrate slurry, which is boiled with alkali at a pH that is over 11, into a sodium titanate slurry, from which the soluble sulphate salts are washed out and which is filtered. The sodium titanate is most preferably prepared as described in detail in the previous patent EP444798 of the applicant, which preparation process is incorporated herein by reference. The sodium titanate provided by the manner described above can be further processed by any known means, whereafter it can be used as starting material at the stage (i).

Any other titanate that behaves like sodium titanate can also be used as the starting material.

According to a preferred embodiment, the sodium titanate is elutriated in water before the metallic salt is mixed therewith. A sodium titanate slurry is preferably prepared from sodium titanate, its density being 150-350 g/l, preferably 200-350 g/l, expressed as titanium dioxide.

The reaction medium of sodium titanate and the metal compound(s) is preferably water. Water preferably essentially originates from the sodium titanate slurry. An alcohol solution can also be used as the medium, or additives can be used in the medium, which improve the solubility of the starting materials, for example.

When needed, the metal compound(s) can also be first dissolved or elutriated in water or the reaction medium before mixing them with the sodium titanate. If there is more than one metal compound, they are preferably mixed in solid form with each other into a preferably homogeneous mixture before mixing them with the sodium titanate.

At the stage (ii) of the process according to the invention, the starting materials are brought in contact with each other for a sufficiently long time, water preferably acting as the medium, so that the reaction is as complete as possible. The mixing is suitably carried out so that the generated dispersion remains homogeneous and no deposition takes place. The mixing speed can be, for example, 20-200 rpm, depending on the reactor size and the mixer used. It is essential that the mixing is sufficient for the reaction to be as complete as possible. For other respects, the way of mixing is not critical.

Keeping the reaction temperature high shortens the reaction time required and the total processing time. The mixture can also be allowed to react into metal titanate at a lower temperature than the boiling point of the mixed slurry, preferably at 100° C. or below, more preferably 75° C. or below, most preferably 59° C. or below, such as 50° C. or below, whereby the reaction time and, thus, the total processing time are still reasonable regarding industrial production. Adjustment of the reaction temperature can also be used to affect the crystallinity and the crystal size of the product.

Depending on the amount, quality, mixing and reaction temperature of the reacting compounds, the mixed slurry can be allowed to react overnight for about 12 hours; however, preferably 5 hours or less; a more preferable reaction time of three hours at the most is sufficient, most preferably an hour at the most, such as 50 minutes at the most, whereby, depending on the temperature, an as short as possible total processing time is obtained. The reaction time can be used to affect the crystallinity of the product and the economic efficiency of the production process, such as the capacity.

When the reaction is completed, the metal titanate product thus generated is optionally washed, and/or filtered and dried. The filtering and drying are carried out in a manner and by means known in the field. Washing and filtering are necessary depending on the amount of permissible impurities in the end product.

The conditions and the chemicals used in the process according to the invention are particularly well-suited to industrial production, and no exceptional precautions, such as an inert protective gas, are needed in handling them.

The metal cation of the metal compound according to the invention has a size that is larger than that of a sodium ion, and its charge is +2 or higher, but it is still capable of replacing sodium in the structure and providing the desired metal titanate.

The term "ionic metal compound" herein refers to a metal compound that forms a metal cation in the medium. The ionic metal compound according to the invention is preferably a compound that at least partly dissolves in the medium or reacts with the medium, forming a soluble compound.

The cation of the metal compound is preferably selected from a group of Al, Bi, Co, Fe, Hf, K, La, Mn, Ni, Pb, Zn, Zr metals and alkali earth metals.

The metal cation is more preferably an alkali earth metal cation. The cation is most preferably $Ba^{2+}$ or $Sr^{2+}$ or a mixture thereof.

The metal compound can be formed by a single metal or it can be a mixture of several metal compounds, or a mixed compound. However, many anions of the compounds that can be considered, such as chlorides or sulphates, have disturbing properties, e.g., they leave impurity residues in the end product, which decrease the performance required of the end product.

According to an embodiment, the metal compound is hydroxide or carbonate. The compound is preferably hydroxide, more preferably an alkali earth compound, most preferably barium hydroxide, strontium hydroxide or a mixture thereof.

The metal compound, or in case there are several of them, their combined amount, and sodium titanate are mixed at the stage (i) in a molar ratio of 0.9-1.8, preferably 0.9-1.6, more preferably 1.0-1.5 or most preferably in a desired stoichiometric molar ratio, which corresponds to and which can be used to achieve the stoichiometry of the intended compound. The mixing ratio determines the molar ratio between the metal cations of the structure thus generated, together with the reaction conditions used.

According to a preferred embodiment, barium hydroxide is added in a molar ratio of barium/titanium of 0.9-1.8, preferably 0.9-1.6, more preferably 1.0-1.5. In this way, the intended Ba/Ti molar ratio is obtained for the barium titanate end product, which ratio is preferably 0.9-1.1, more preferably 0.95-1.05, most preferably 0.98-1.01. When needed, a medium, preferably water is further added to the mixture to facilitate the mixing.

According to another preferred embodiment, two or more metal compounds, preferably barium hydroxide and strontium hydroxide, are added, in proportion of the total molar amount of these metals to the molar amount of titanium, preferably in a molar ratio of (Ba+Sr)/Ti of 0.9-1.8, preferably 0.9-1.6, more preferably 1.0-1.5, wherein the amounts of the different metals have thus been combined in relation to the molar amount of titanium. For example, Ba and Sr can form a solid solution of any ratio; therefore, their mutual molar ratio may vary within the corresponding limits. The molar ratio of Sr/Ba is preferably 0.01-1.00. The Sr/Ba molar ratio that is to be selected depends on the purpose of use of the desired end product; the ratio can be used to adjust the dielectric properties of the end product, such as the temperature dependence of the dielectric constant. Barium hydroxide and strontium hydroxide are more preferably added in a molar ratio of barium/strontium/titanium, which corresponds to the intended molar ratio of the final structure, e.g., Ti:Ba:Sr is preferably 0.9-1.1:0.5-0.6:0.4-0.5, more preferably 0.98-1.01:0.52-0.58:0.42-0.48, such as about 1.0:0.55:0.45. In this way, the intended molar ratio of (Ba+Sr)/Ti, which is preferably 0.9-1.1, more preferably 0.95-1.05, most preferably 0.98-1.01, is obtained for the metal titanate end product, e.g., preferably barium strontium titanate end product. When needed, a medium, such as water, is added to the mixture, respectively, to facilitate the mixing.

According to an embodiment, the metal hydroxide, preferably barium hydroxide, strontium hydroxide or a mixture thereof, is first dissolved in water before combining it with a titanium-containing slurry. In the case of Ba and Sr hydroxides, these are more preferably mixed with each other in a solid or dissolved form before adding them to the titanium-containing slurry, whereby the various compounds are mixed in the most effective manner.

According to another embodiment, the metal hydroxide, preferably barium hydroxide or strontium hydroxide, is added in solid form to the titanium-containing slurry.

At the stage (iii), the metal titanate product, preferably barium, strontium or barium strontium titanate product, is preferably filtered and washed to remove the sodium of the starting material from the end product. Finally, the product is dried in a manner known in the field.

According to a preferred embodiment, drying takes place at a raised temperature, preferably at a temperature of 250° C. or below, more preferably below 200° C., most preferably below 155° C., such as 110° C. or below, more preferably, e.g. 50° C. or below and, optionally, in a vacuum. The drying can be implemented by any process and equipment known in the field, preferably a vertical drying furnace, rotating drying furnace or spray drier.

The dried metal titanate product provided by the process described above, preferably barium, strontium or barium strontium titanate, can be further processed by calcination. Depending on the calcination conditions used, such as the calcining temperature and time, cubic or tetragonal metal titanate are obtained, for example.

To the calcining stage, chemicals are preferably added, which adjust the crystal structure and/or crystal size of the end product. These include known calcining chemicals, such as those mentioned in the Patent Specification EP444798, preferably Zr compounds, such as zirconium hydroxide.

According to its second aspect, the invention provides a metal titanate product that is prepared by the process described above. The metal titanate product is preferably barium titanate, strontium titanate or barium strontium titanate.

Using an x-ray powder diffraction (XRD), the crystal structure and crystal size can be measured on the product thus generated, and its specific surface area (BET), particle size and particle size distribution $d_{50}$, wherein $d_{50}$, as is well known, means that 50% of the particles of the volume distribution have a diameter that is below this value, as well as the chemical analyses of the most important components, such as Ba, Sr, Ti, and any harmful impurities, such as Na, S and Cl.

The crystal size of the alkali earth metal titanate product, such as barium, strontium or barium strontium titanate for both crystal forms, cubic and tetragonal, is preferably 300 nm or below, preferably 170 nm or below, more preferably 40-170 nm, as determined on the basis of transmission electron microscopy (TEM) images and/or XRD.

Furthermore, the alkali earth metal titanate product, such as barium, strontium or barium strontium titanate, preferably has a particle size distribution value $d_{50}$ of below 50 µm.

Furthermore, the specific surface area, BET, of the product thus obtained, such as barium, strontium or barium strontium titanate, is preferably 1-50 $m^2/g$, preferably 2-15 $m^2/g$.

On the basis of the x-ray powder diffraction measurements, no reflection peaks, such as sodium titanate, which are due to the starting material, could be found in the product. The metal titanate product, such as barium, strontium or barium strontium titanate, is extremely pure and contains minor amounts of impurities only. These preferably include sodium, its amount typically being below 3% by weight, more preferably below 0.5% by weight in a washed product, most preferably below 0.2% by weight in the washed product; sulphur, which is typically in an amount of less than 0.12% by weight, preferably 0.05% by weight or below in the washed product, more preferably 0.01% by weight or less in the washed product; and chlorine, which is typically in an amount of 0.01% by weight or below in the washed product. The washing steps that are carried out when preparing the product, preferably the washing steps carried out with water, also effectively remove the soluble chloride compounds, for example.

In the following, the invention is described in detail by means of examples. The purpose of the examples is not to limit the invention.

EXAMPLES

The Ba, Sr and Ti ratios presented in the examples have been determined in a known manner by accurately weighing about 100 mg of the sample to be assayed in a dissolving vessel and adding 30 ml of 20% analysis-grade hydrochloric acid. The dissolving vessels are heated in a sand bath, until the sample has dissolved. The cooled solution is diluted into 100 ml with analysis-grade 10% hydrochloric acid. For the determination, the sample is diluted 1:6 with analysis-grade 10% hydrochloric acid.

The concentrations of titanium and the other metals of the sample thus prepared are determined using a PerkinElmer Optima 4300DV ICP-OES analyzer at the emission wavelengths of 230.425 nm, 233.527 nm and 413.065 nm for barium; 232.235 nm, and 460.733 nm for strontium; and 334.945 nm, 336.121 nm and 337.279 nm for titanium.

The particle size of the particles generated can be determined using applicable equipment, such as the Malvern Mastersizer 2000 apparatus. For determining the specific surface area, any device known in the art can be used, such as the Quantachrome Corp. NOVA 3200 version 6.11 apparatus, which is used in the measurements below.

The crystal form and crystal size are determined from the samples by the Philips' XRD apparatus in the two-theta angle range of 10-70°.

Example 1

The preparation of titanium dioxide by the sulphate process was initiated by reacting ilmenite concentrate with sulphuric acid. The solid reaction cake thus formed was dissolved by means of water and waste acids. Impurities were removed and iron sulphate was crystallized out. The titanium-containing solution was concentrated and the titanium dioxide hydrate was precipitated by hydrolysis. This precipitation material was washed in several stages to render it free of salts.

About 10 tonnes of washed titanium dioxide hydrate precipitation material was taken, expressed as $TiO_2$, and elutriated with water to a density of 300-400 g/l, the aim being 350 g/l. The slurry thus provided was rendered highly alkaline, pH>11, by adding about 15 tonnes of NaOH as an NaOH solution at 60° C., its concentration being 700 g/l. The temperature of the slurry was raised to 95° C. and the slurry was agitated at this temperature for two hours. During the treatment, the titanium dioxide hydrate material reacted with lye, forming solid sodium titanate, from which sulphate ions were further removed by washing the slurry with hot water for so long that sulphates were no longer found in the filtrate by barium chloride precipitation.

The sulphate-free sodium titanate was elutriated in water, so that the concentration of the slurry, expressed as titanium dioxide, was about 200 g/l, and heated to 75° C. under continuous agitation.

Solid barium hydroxide ($Ba(OH)_2.8H_2O$) was added to the slurry at 316 g/80 g $TiO_2$, corresponding to a Ba/Ti molar ratio of 1.0. The mixture was allowed to react at a temperature of 75° C. for 60 minutes under continuous agitation. The precipitate was filtered and washed with plenty of warm water. The sample was dried in a vertical drying furnace at a temperature of 110° C., until dry. The dry sample was divided into partial samples and calcined in a rotating furnace for 1.5 hours at three different temperatures of 450, 750 and 1100° C.

According to the x-ray diffraction analysis, crystalline $BaTiO_3$ was formed in all of the samples, as shown in Table 2. Neither peaks of sodium titanate that were due to the starting material, nor peaks of titanium dioxide occur in the samples. Measured from the broadening of the x-ray diffraction peaks, the crystal size was mainly below 100 nm, and in all of the samples, below 200 nm. The molar ratio of barium-titanium is 0.94 and the analyses show that the sodium content remains at 0.0124% by weight and the sulphur and chlorine contents below 0.01% by weight (below the determination limit).

TABLE 2

| Sample | Calcining temperature [° C.] | Crystal size from the broadening of the XRD peak [nm] | | | BET [m²/g] |
|---|---|---|---|---|---|
| | | ~31° | ~39° | ~45° | |
| 1.1 | 110 | 32 | 44 | 30 | 36.4 |
| 1.2 | 450 | 34 | 46 | 34 | 29.2 |
| 1.3 | 750 | 46 | 63 | 37 | 9.7 |
| 1.4 | 1100 | 82 | >100 (170) | 32 | 4.7 |

Figure 2:
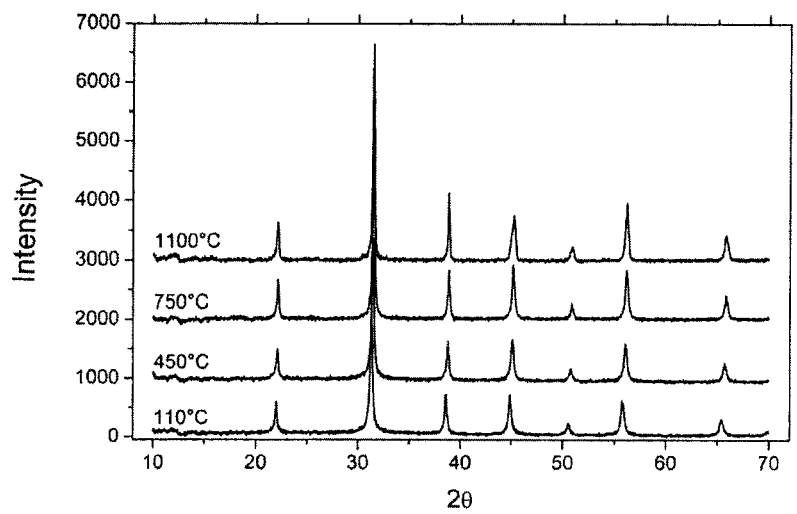
FIG. 2 shows the x-ray powder diffractograms of the barium titanate product according to the invention, wherein the molar ratio Ba/Ti is 1.0, related to Example 1.

The x-ray diffractograms of the dried sample 1.1 and calcined samples 1.2 and 1.3 are shown in FIG. 2. In the figures, the y axis is an intensity reading, as is well known, and the x axis is degrees two-theta.

Example 2

The samples were prepared as in Example 1; however, with the distinction that the molar ratio Ba/Ti of the barium hydroxide addition was 1.2.

According to the x-ray diffraction analysis, crystalline $BaTiO_3$ was formed in all of the samples, as shown in Table 3. Neither peaks of sodium titanate that are due to the starting material, nor peaks of titanium dioxide occur in the samples. Measured from the broadening of the x-ray diffraction peaks, the crystal size is below 100 nm. The molar ratio of barium-titanium was 0.98 and the analyses show that the sodium content remained at 0.011% by weight.

TABLE 3

| Sample | T [° C.] | Ba:Ti mol | Crystal size from the broadening of the peak [nm] | | | BET [m2/g] |
|---|---|---|---|---|---|---|
| | | | ~31° | ~39° | ~45° | |
| 2.1 | 110 | 0.98 | 33 | 42 | 29 | 36.1 |
| 2.2 | 450 | | 35 | 45 | 31 | 30.5 |
| 2.3 | 750 | | 47 | 63 | 34 | 10.8 |

Figure 3:
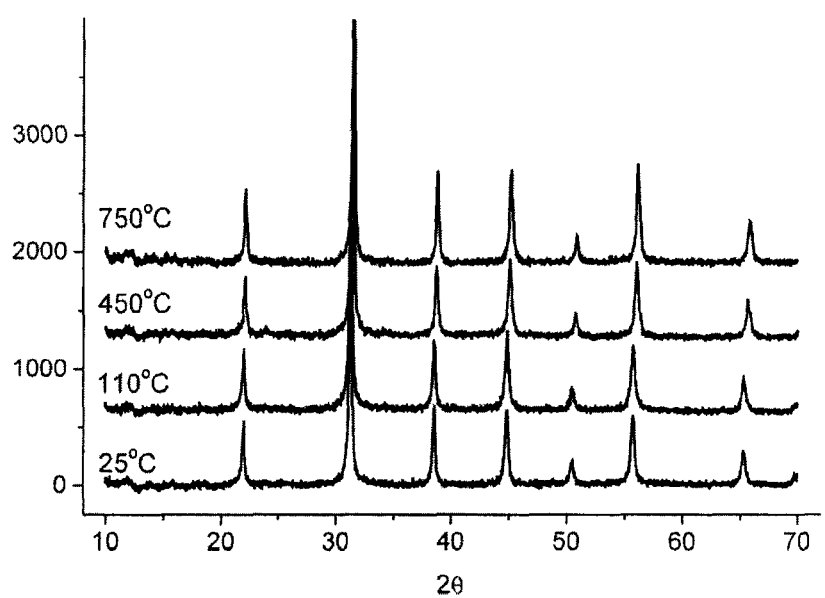
FIG. 3 shows the x-ray powder diffractograms of the barium titanate product according to the invention, wherein the molar ratio Ba/Ti is 1.2, related to Examples 2 and 4.

The x-ray diffractograms of the dried sample 2.1 and calcined samples 2.2 and 2.3 are shown in FIG. 3. In the figures, the y axis is an intensity reading, as is well known, and the x axis is degrees two-theta.

Example 3

The samples were prepared as in Example 1; however, with the distinction that the molar ratio Ba/Ti of the barium hydroxide addition was 1.4.

The mixture was allowed to react at 75° C. for 180 minutes under continuous agitation. The precipitate was filtered and washed with plenty of warm water. The sample was dried in a vertical drying furnace at a temperature of 110° C., until dry. The sample was divided into four parts, of which one part was not calcined and the other three were calcined at temperatures of 750° C., 850° C. and 950° C.

According to the x-ray diffraction analysis, crystalline $BaTiO_3$ was formed in all the samples, as shown in Table 4. Neither peaks of sodium titanate that were due to the starting material, nor peaks of titanium dioxide occur in the samples. Measured from the broadening of the x-ray diffraction peak, the crystal size is below 100 nm. The molar ratio of barium-titanium is 0.99 and the analyses show that the sodium content remains at 0.025% by weight.

TABLE 4

| Sample | T [° C.] | Ba:Ti mol | Crystal size from the broadening of the peak [nm] | | | BET [m2/g] |
|---|---|---|---|---|---|---|
| | | | ~31° | ~39° | ~45° | |
| 3.1 | 110 | 0.99 | 28 | 29 | 24 | 45.2 |
| 3.2 | 750 | | 42 | 46 | 37 | 15.0 |
| 3.3 | 850 | | 49 | 63 | 37 | 12.7 |
| 3.4 | 950 | | 62 | 84 | 35 | 6.6 |

Figure 4:
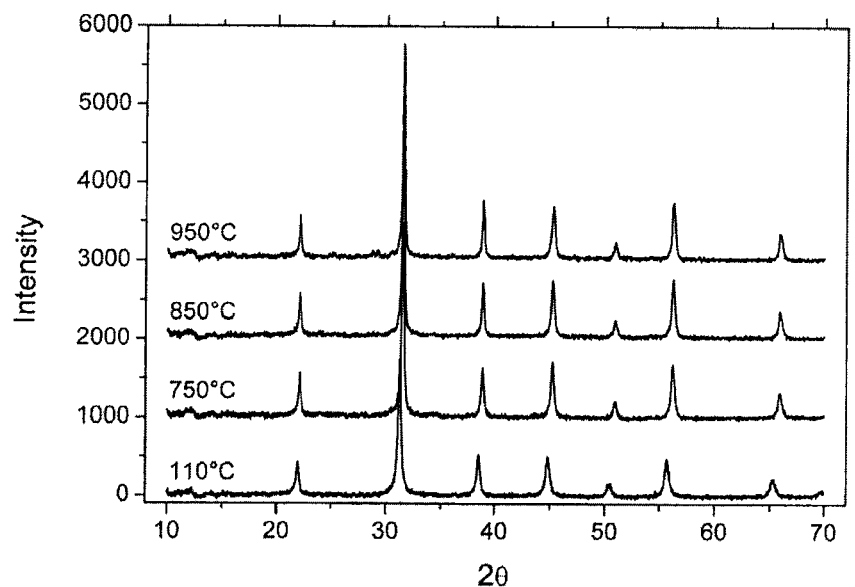
FIG. 4 shows the x-ray powder diffractograms of the barium titanate product according to the invention, wherein the molar ratio Ba/Ti is 1.4, related to Example 3.

The x-ray diffractograms of the dried sample 3.1 and calcined samples 3.2 and 3.3 are shown in FIG. 4. In the figures, the y axis is an intensity reading, as is well known, and the x axis is degrees two-theta.

Example 4

The samples were prepared as in Example 1; however, with the distinction that the molar ratio Ba/Ti of the barium hydroxide addition was 1.2, and the sample was dried in a vacuum at room temperature, 25° C.

According to the x-ray diffraction analysis, crystalline $BaTiO_3$ was formed in the sample, as shown in FIG. 3 (25° C.). Neither peaks of sodium titanate that were due to the starting material, nor peaks of titanium dioxide occur in the sample. The molar ratio of barium-titanium is 0.99 and the analyses show that the sodium content remained at 0.017% by weight and the sulphur content below 0.01% by weight. The specific surface area BET of the sample was 29.5 m²/g.

Example 5

The samples were prepared as in Example 1; however, with the distinction that both barium hydroxide and strontium hydroxide were added to the sodium titanate slurry.

71.7 g of solid barium hydroxide ($Ba(OH)_2.H_2O$) and 82.4 g of solid strontium hydroxide ($Sr(OH)_2.8H_2O$) were mixed with each other and the mixture was added to the sodium titanate slurry. The mixed composition thus provided corresponds to a (Ba+Sr)/Ti molar ratio of 1.1 and to a Ba/Sr molar ratio of 0.55/0.45. The mixture was allowed to react at a temperature of 75° C. for 180 minutes under continuous agitation. The precipitate was filtered and washed with plenty of warm water. The sample was dried in a vertical drying furnace at a temperature of 110° C., until dry.

Figure 5:
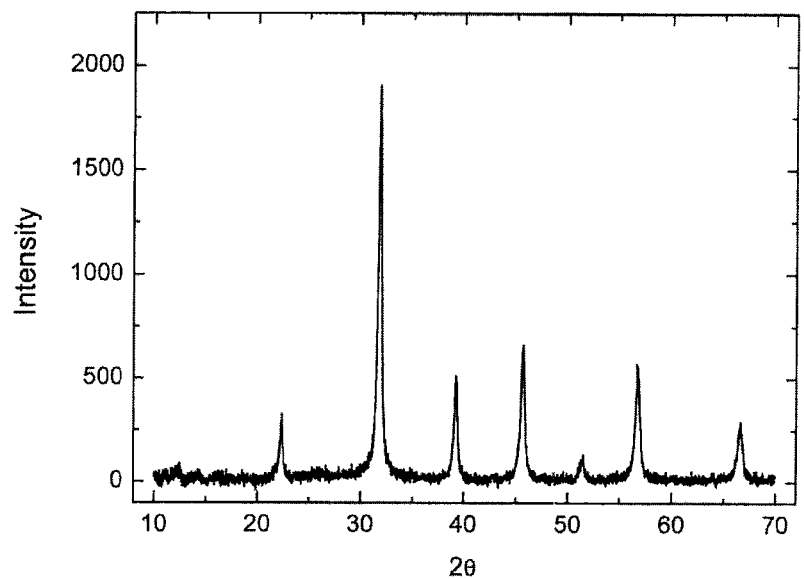
FIG. 5 shows the x-ray powder diffractogram of the barium strontium titanate according to the invention, related to Example 5.

According to the x-ray diffraction analysis, crystalline barium strontium titanate is formed in the sample, as shown in FIG. 5. In the figure, the y axis is an intensity reading, as is well known, and the x axis is degrees two-theta.

Neither peaks of sodium titanate that were due to the starting material, nor peaks of titanium dioxide occur in the samples. Measured from the broadening of the x-ray diffraction peak (~39°), the crystal size was about 32 nm. The molar ratio of (barium+strontium)/titanium is 1.04, and the Sr/Ba molar ratio is 0.94. The analyses show that the sodium content remained at 0.024% by weight and the sulphur content below 0.01% by weight (below the determination limit). The specific surface area BET of the sample was 47.6 m²/g.

Example 6

The samples were prepared as in Example 1; however, with the distinction that strontium hydroxide ($Sr(OH)_2.8H_2O$) was added to the sodium titanate slurry at 183.0 g/50 g $TiO_2$, corresponding to the molar ratio Sr/Ti of 1.1.

The mixture was allowed to react at a temperature of 75° C. for 180 minutes under continuous agitation. The precipitate was filtered and washed with plenty of warm water. The sample was dried in a vertical drying furnace at a temperature of 110° C., until dry.

Figure 6:
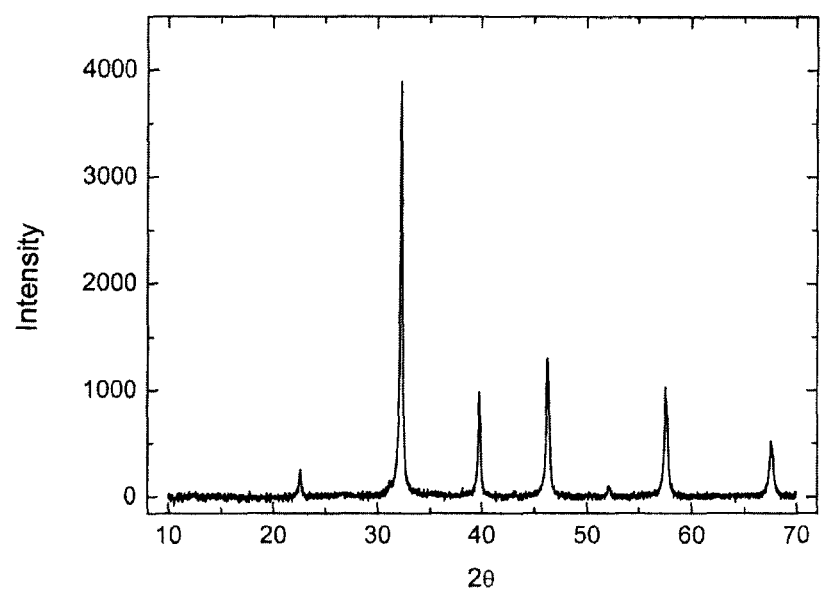
FIG. 6 shows the x-ray powder diffractogram of the SrTiO$_3$ according to the invention, related to Example 6.

According to the x-ray diffraction analysis, crystalline $SrTiO_3$ was formed in the sample, as shown in FIG. 6. Measured from the broadening of the x-ray diffraction peak (~39°), the crystal size was about 56 nm. The molar ratio Sr/Ti of the strontium titanate end product was 1.07, the sodium content remained at 0.054% by weight and the sulphur content below 0.01% by weight. In the figure, the y axis is an intensity reading, as is well known, and the x axis is degrees two-theta.

The invention claimed is:

1. A process of preparing metal titanate from one or more metal compounds, comprising the steps of:
    a) mixing sodium titanate and an ionic metal compound(s) at ambient pressure and in an ambient gaseous atmosphere to form an aqueous mixed slurry;
    b) allowing the mixed slurry to react, precipitate and form a crystalline metal titanate product at ambient pressure and in an ambient gaseous atmosphere at or below a boiling point of the mixed slurry and
    c) washing and/or filtering and drying the metal titanate product.

2. The process according to claim 1, wherein said mixed slurry is allowed to react into the metal titanate product at a temperature of 100° C. or below.

3. The process according to claim 1, wherein the ionic metal compound(s) comprises a metal cation selected from the group consisting of Al, Bi, Fe, Hf, K, La, Mn, Ni, Pb, Zn, Zr and alkali earth metals.

4. The process according to claim 1, wherein the ionic metal compound(s) comprises a metal cation comprising an alkali earth metal.

5. The process according to claim 1, wherein the ionic metal compound(s) comprises a metal cation comprising Ba and/or Sr.

6. The process according to claim 1, wherein the ionic metal compound(s) is a hydroxide or a carbonate.

7. The process according to claim 1, wherein the ionic metal compound is an alkali earth metal hydroxide.

8. The process according to claim 1, wherein the aqueous mixed slurry is allowed to react for 12 hours to precipitate and form the metal titanate product.

9. The process according to claim 1, wherein the sodium titanate is in a form of an aqueous slurry.

10. The process according to claim 1, further comprising the step of preparing the sodium titanate by reacting titanium dioxide with alkali to form a slurry of the sodium titanate.

11. The process according to claim 1, further comprising the step of preparing the sodium titanate from an ilmenite concentrate by means of sulphuric acid, by hydrolyzing titanium dioxide hydrate, which is elutriated in water into a density of 300-400 g/l into a titanium dioxide hydrate slurry, which is boiled with alkali at a pH that is over 11 into a slurry of the sodium titanate, from which soluble sulphate salts are washed out and which is filtered.

12. The process according to claim 1, further comprising a step where the sodium titanate is elutriated in water into a sodium titanate slurry at a density of 150-350 g/l.

13. The process according to claim 1, wherein molar ratio of sodium titanate to ionic metal compound(s) is between 0.9 and 1.8.

14. The process according to claim 1, wherein the metal titanate product is dried at a temperature of below 250° C. and, optionally, in a vacuum, to form a dried metal titanate product.

15. The process according to claim 14, wherein the dried metal titanate product is further processed by calcining at a temperature of 950° C. or below.

16. A metal titanate product, prepared by the process according to claim 1 wherein the product has a crystal size less than 170 nm.

* * * * *